(Model.)
S. J. McDONALD & C. W. SHAEFER.
FIFTH WHEEL.
No. 306,504. Patented Oct. 14, 1884.
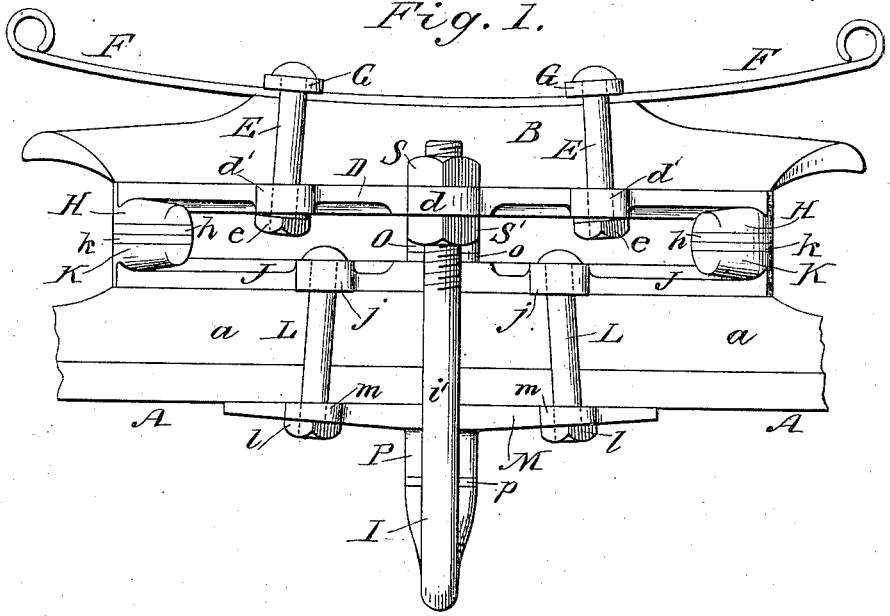
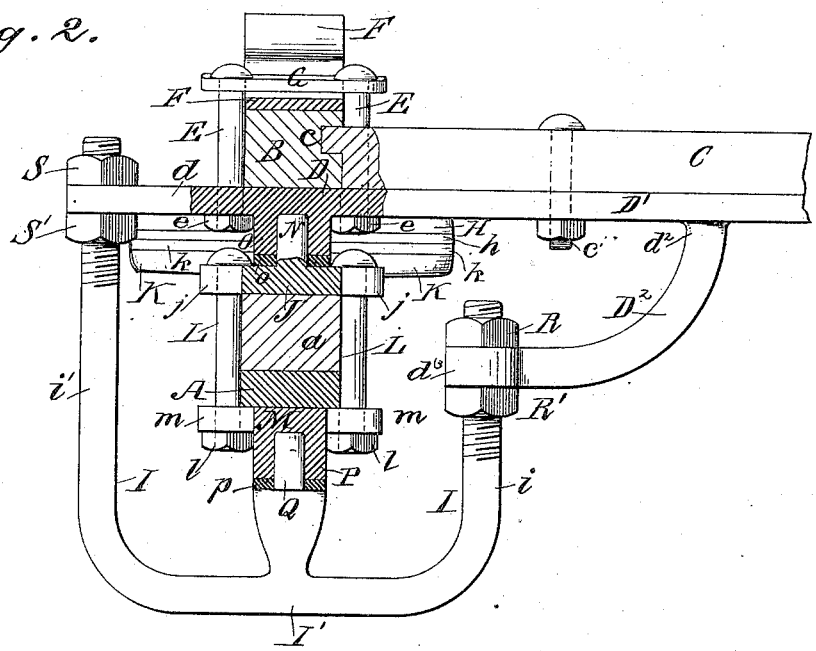
WITNESSES:
INVENTOR:
S. J. McDonald
C. W. Shaefer
BY Munn & Co
ATTORNEYS.

United States Patent Office.

SAMUEL J. McDONALD AND CHARLES W. SHAEFER, OF GALLATIN, MISSOURI; SAID SHAEFER ASSIGNOR TO SAID McDONALD.

FIFTH-WHEEL.

SPECIFICATION forming part of Letters Patent No. 306,504, dated October 14, 1884.

Application filed June 21, 1884. (Model.)

*To all whom it may concern:*

Be it known that we, SAMUEL J. McDONALD and CHARLES W. SHAEFER, both of Gallatin, in the county of Daviess and State of Missouri, have invented certain new and useful Improvements in Fifth-Wheel Couplings, of which the following is a full, clear, and exact description.

Our invention relates to the fifth-wheel couplings of buggies or other vehicles.

The invention consists in particular constructions of parts of the coupling and combinations of the parts with each other and with the head-block and axle of the vehicle, the whole making a strong, durable coupling, practical for its purposes, and presenting a neat finish, all as hereinafter fully described and claimed.

Reference is to be had to the accompanying drawings, forming part of this specification, in which similar letters of reference indicate corresponding parts in both the figures.

Figure 1 is a front elevation of our improved fifth-wheel couplings as applied to an axle, head-block, and reach, and Fig. 2 is a sectional side elevation of the same.

The letter A indicates the axle of a buggy or other vehicle, and $a$ the axle-block.

B is the head-block or bolster, and C is the reach, which is or may be tenoned into the head-block, as at $c$.

D is the perch or head-block plate, which we make with a lug, $d$, projecting forward of and at right angles with the main body of the plate, and the plate has front and rear lugs, $d'$, for the passage of the bolts E, which hold the rocker-arm F to the head-block by means of the clip-plates G and nuts $e$, and so that the head-block is not pierced by the bolts. The head-block plate D carries at its opposite ends the upper curved arms, H H, of the fifth-wheel, and has also a central arm, D', which extends backward beneath the reach C a suitable distance, and is bolted to the reach, as at $c'$.

$D^2$ is an arm or bracket, which is fixed at $d^2$ to the plate D, preferably by welding, and extends downward and forward, and has an end bearing or eye, $d^3$, to receive the back end or arm, $i$, of the yoke I, on which the axle A has its lower pivot-bearing.

J is the axle-plate, to which the lower curved arms, K K, of the fifth-wheel are fixed at opposite ends.

L are bolts, which are passed through lugs $j$ at the opposite edges of the plate J, and through lugs $m$ at opposite edges of the axle pivot-plate M, and receive nuts $l$ below the lugs $m$. The bolts L pass outside of the axle A and its block $a$, and thus serve to hold the plates J M to the axle without piercing it, the full strength of the axle thus being preserved.

We face the fifth-wheel arms or sections H K with independent steel plates $h\ k$, respectively, secured to the fifth-wheel arms by bolts or screws, to take the wear off the arms on each other, and insure durability of the arms by permitting a renewal of the plates. The axle-plate J has a pin, N, which enters a boss, O, formed on the head-block plate D, for the upper pivot of the axle A, and the plate M has a boss, P, in which a pin, Q, formed on or fixed to the cross-piece I' of the yoke I enters, for the lower pivot of the axle, and suitable washers, $o\ p$, of leather or other material, are placed on the pivot-pins N Q, respectively, to exclude dust from the pivot-joints and insure the turning of the axle with little or no noise. It will be seen that the pivots N Q take the place of a king-bolt, and that the axle is not weakened by piercing it, as when a king-bolt is used. The yoke I connects with the arm $D^2$ of the head-block plate by the passage of its rear arm, $i$, through the eye $d^3$ of the arm $D^2$. The end of arm $i$ is screw-threaded to receive the nuts R R', placed respectively above and below the eye $d^3$. The forward arm, $i'$, of the yoke I also is screw-threaded on the end to receive the nuts S S' at each side of the lug $d$ of the head-block plate D. The yoke I thus is held to the lug $d$ and arm $D^2$ in front and rear of the axle, and so that by adjusting the nuts R R' S S' the yoke may be lifted at any time to take up the wear at the faces of the fifth-wheel arms or sections, or at the pivot-joints of the axle, and by removing the upper nuts, R S, the entire front running-gear may quickly be dismembered for repair or renewal of any overworn or broken part.

By our arrangement of the fixed arm $D^2$ with the yoke I ample room is afforded to reach the back nuts, R R', to apply a wrench in making adjustments of the parts, and by the connection of the arm at $d^2$ some distance back of the joint of the reach with the head-block said joint is braced more securely and the yoke is held more firmly; and, furthermore, the turning of the axle on the pivots N Q cannot possibly loosen the nuts which connect the yoke-eye to the head-block plate D. The upper and lower nuts, R R' S S', serve also to lock each other and the arms of the yoke, so that when the wear is taken up the parts will be held securely where set.

The pivot-pins N Q may of course be formed on the plates D M, respectively, and the bosses O P on the plate J and yoke I, respectively, or separate pivot-pins may be provided; but the construction shown is preferred.

Having thus described our invention, what we claim as new, and desire to secure by Letters Patent, is—

1. In a fifth-wheel, the yoke I, formed with a central socket arm or pin, Q, and with the vertical long and short arms $i'$ and $i$, screw-threaded at their upper ends, substantially as set forth.

2. In a fifth-wheel, the head-block plate D, formed with the front lug, $d$, socket O, reach-arm D', upper section H, and the downward and forward curved arm, $D^2$, having an eye, $d^3$, substantially as set forth.

3. The fifth-wheel herein described, consisting, essentially, of the head-block plate D, having the upper section, H, forward lug, $d$, lugs $d'$ on its opposite sides, socket O, reach-arm D', and the downward-curved arm $D^2$, all made integral, axle-plate J, formed with a pin, N, to engage socket O, and with the lower section, K, and lugs $j$, axle-pivot plate M, formed with lugs $m$, and with a socket, P, the yoke I, formed with a central pin, Q, engaging the socket P, and with a long and short arm, $i'$ $i$, engaging at their upper ends the lug $d$, and the curved arm $D^2$ of the head block plate, all combined and constructed substantially as set forth.

SAMUEL J. McDONALD.
CHAS. W. SHAEFER.

Witnesses:
OSCAR SAYLOR,
FRANK E. CLINGAN.